US012534242B1

(12) United States Patent
Almarza et al.

(10) Patent No.: US 12,534,242 B1
(45) Date of Patent: Jan. 27, 2026

(54) SYSTEMS AND METHODS FOR APPLYING A DISPOSABLE WRAPPING ON A VEHICLE CONNECTOR

(71) Applicant: Ford Global Technologies, LLC, Dearborn, MI (US)

(72) Inventors: Fernando Almarza, Atizapán de Zaragoza (MX); Carlos Garza, Coyoacan (MX)

( * ) Notice: Subject to any disclaimer, the term of this patent is extended or adjusted under 35 U.S.C. 154(b) by 0 days.

(21) Appl. No.: 18/898,902

(22) Filed: Sep. 27, 2024

(51) Int. Cl.
*B65B 11/08* (2006.01)
*B60R 16/02* (2006.01)
*B65B 53/02* (2006.01)
*B65B 61/06* (2006.01)
*B60R 16/023* (2006.01)

(52) U.S. Cl.
CPC .......... *B65B 11/08* (2013.01); *B60R 16/0215* (2013.01); *B65B 53/02* (2013.01); *B65B 61/06* (2013.01); *B60R 16/0238* (2013.01)

(58) Field of Classification Search
CPC ......... B65B 11/08; B65B 53/02; B65B 61/06; B60R 16/0238; B60R 16/0215
See application file for complete search history.

(56) References Cited

U.S. PATENT DOCUMENTS 3,716,960 A * 2/1973 Wright .................... B65B 11/08 53/228
5,125,609 A * 6/1992 Demeo ..................... B44C 7/06 248/309.2
2003/0136085 A1* 7/2003 Hendricks ............. B65B 11/045 53/441
2009/0260334 A1* 10/2009 Bubar ..................... B65B 11/08 53/466
2010/0242418 A1* 9/2010 Thurgood ............... B65B 9/073 53/562

(Continued)

FOREIGN PATENT DOCUMENTS

JP 2009202918 A 9/2009
KR 100712705 B1 5/2007

OTHER PUBLICATIONS

Vestil, Wall-Mounted Strapping Dispenser, 2004, https://www.vestil.com/product.php?FID=410, p. 1.

*Primary Examiner* — Himchan Song
(74) *Attorney, Agent, or Firm* — Frank Lollo; Eversheds Sutherland (US) LLP

(57) ABSTRACT

An apparatus comprising a housing, a covering storage, a retractable guide and a heating element is disclosed. The housing includes an elongated opening configured to receive an external object and enable the external object to slide in a housing interior portion. The covering storage stores and dispenses a flexible covering. The retractable guide is disposed in the housing, and configured to retractably move from a closed position to an open position and then return back to the closed position when the external object slides in the housing interior portion touching the retractable guide. The covering storage dispenses the flexible covering that covers an external object exterior surface when the retractable guide moves from the closed position to the open position. The heating element heats the flexible covering on the external object exterior surface to cause the flexible covering to enclose the external object.

20 Claims, 8 Drawing Sheets

(56) References Cited

U.S. PATENT DOCUMENTS

| | | | | |
|---|---|---|---|---|
| 2013/0298498 | A1* | 11/2013 | Imamaki | B65B 11/08 53/203 |
| 2014/0224865 | A1* | 8/2014 | Takahashi | B65D 5/18 229/183 |
| 2015/0033679 | A1* | 2/2015 | Takahashi | B65B 57/04 53/556 |
| 2015/0165717 | A1* | 6/2015 | Page | B65H 23/06 242/594.6 |
| 2015/0321775 | A1* | 11/2015 | Beck | A47G 21/16 53/414 |
| 2017/0029237 | A1* | 2/2017 | Galindo Gonzalez | B65H 75/14 |
| 2018/0244012 | A1* | 8/2018 | Ward | B65B 25/065 |
| 2023/0090054 | A1* | 3/2023 | Radovani | B65B 9/02 53/477 |
| 2023/0202698 | A1* | 6/2023 | Tateossian | B65B 53/02 53/439 |
| 2024/0280125 | A1* | 8/2024 | Almarza | F16B 2/22 |
| 2025/0033821 | A1* | 1/2025 | Talda | B65B 41/14 |
| 2025/0162744 | A1* | 5/2025 | Dietrich | B65B 49/14 |

* cited by examiner

SYSTEMS AND METHODS FOR APPLYING A DISPOSABLE WRAPPING ON A VEHICLE CONNECTOR

FIELD

The present disclosure relates to systems and methods for applying a disposable protective wrapping on an electrical distribution system (EDS) harness connector of a vehicle.

BACKGROUND

Modern vehicles typically include a plurality of electrical distribution system (EDS) harnesses that are made up of wires, fuses, connectors, etc. During the manufacturing or assembling process of a vehicle, the EDS harnesses are required to be transported/shipped from their source locations (e.g., from the manufacturing plant) to the assembly lines where the EDS harnesses are installed in various vehicle components.

An EDS harness may get exposed to dust, debris, moisture, and/or other contaminants when the EDS harness is transported.

A conventional method to protect a connector is to apply a cap on the connector, which shields the connector from contaminants during transportation. While the caps do protect the connectors from the contaminants, the usage of caps can be expensive. In addition, a substantial effort is required to install the caps on the connectors before transportation, as well as removing the caps from the connectors after transportation (e.g., at the assembly line). Moreover, if the caps are not properly installed, this may allow contaminants to enter.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
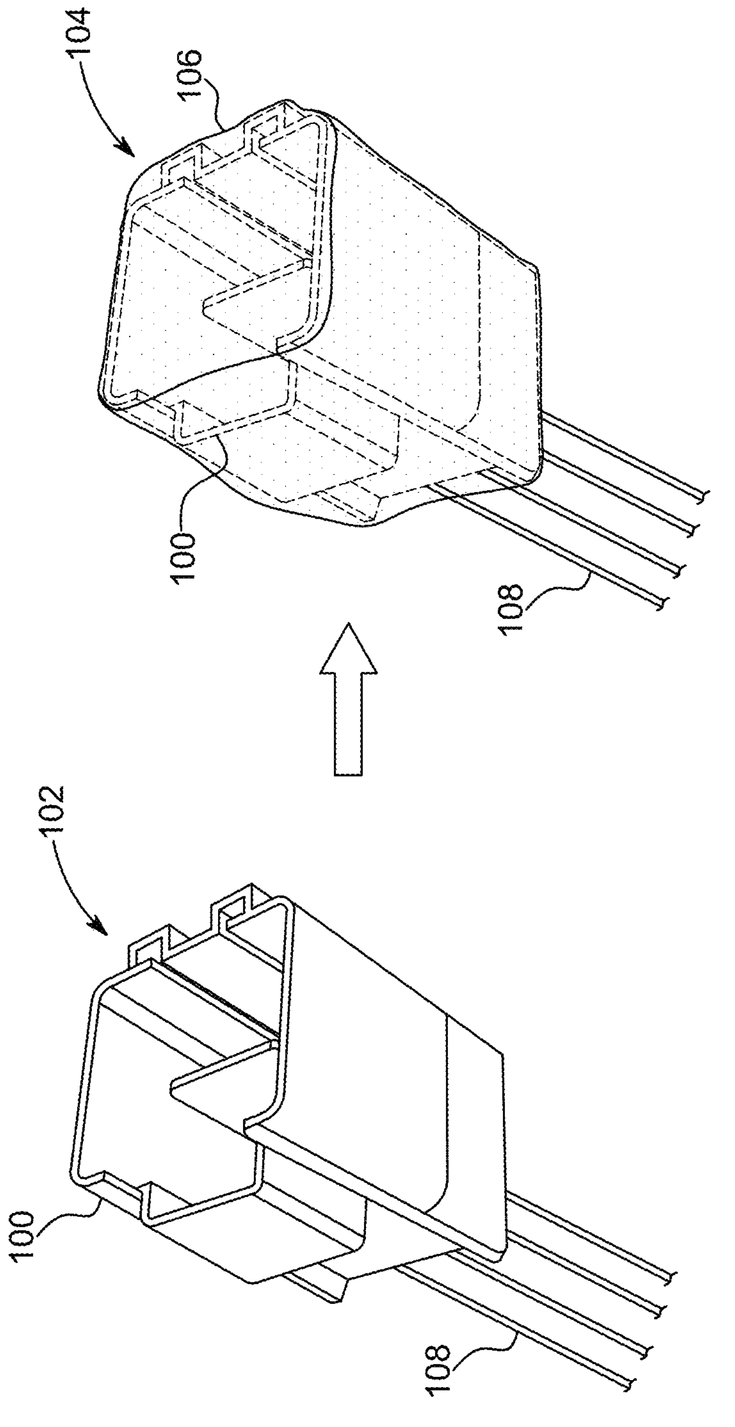
FIG. 1 depicts views of a vehicle's electrical distribution system (EDS) harness connector in an unwrapped state and a wrapped state in accordance with the present disclosure.

The present disclosure describes an apparatus that facilitates a user to conveniently cover or wrap a vehicle component with a disposable flexible covering, to protect the vehicle component from contaminants during transportation (e.g., from a manufacturing plant to an assembly line). In an exemplary aspect, the vehicle component may be an electrical distribution system (EDS) harness connector ("connector"), and the flexible covering may be a Poly Vinyl Chloride (PVC) film. The apparatus may be wall-mounted or handheld, and may be lightweight, which may enable the user to conveniently and quickly wrap the PVC film on the connector.

In some aspects, the apparatus may include a plurality of components including, but not limited to, a housing, a PVC film bundle, a pair of opposing retractable guide plates, one or more cutters, one or more heating elements, and/or the like. The housing may be shaped as a cuboid, and may include a hollow interior portion. The housing may further include an elongated opening disposed along a housing length on a housing front wall.

The PVC film bundle may be disposed in proximity to a housing top portion, above the pair of opposing retractable guide plates. The PVC film bundle may be configured to dispense the PVC film in the housing interior portion, which may be used to wrap the connector. Each retractable guide plate may be a concave shaped plate with a curved interior surface, and may be configured to retractable move from a closed position (which may be the guide plate's default position) to an open position. In some aspects, distal ends of the opposing retractable guide plates may be disposed in proximity to each other in the closed position, and the distal ends may be disposed away from each other in the open position.

In an exemplary aspect, the PVC film dispensed from the PVC film bundle may enclose the retractable guide plates and be connected at the guide plate's distal ends to form a film's "cup-shaped" structure near the guide plate's distal ends. In another exemplary aspect, the PVC film dispensed from the PVC film bundle may be disposed between the retractable guide plates. The cutters may be disposed under the guide plate's distal ends (and under the film's cup-shaped structure) in the housing interior portion, and configured to cut the PVC film. Further, the heating elements may be disposed under the cutters in the housing interior portion, and configured to heat the PVC film.

During operation, when the user desires to wrap a connector with the PVC film, the user may insert the connector into a housing interior portion top part in proximity to guide plate's proximal ends via the elongated opening. The user may then slide the connector "downwards" in the housing interior portion via the elongated opening. The connector's downward sliding motion may cause the connector to touch and push the curved interior surfaces of the guide plates, thereby causing the guide plates to move from the closed position to the open position. Further, as the connector slides down further when the guide plates move to the open position, the connector may push and "stretch" the film's cup-shaped structure under the guide plate's distal ends.

As the user continues to slide down the connector in the housing interior portion, the connector may exit the guide plate's distal ends and may move below the cutters. At this stage, the cutter may cut the PVC film above the connector (i.e., the "stretched" part of the PVC above the connector). As the connector slides down further, the heating elements may heat the PVC film disposed on the connector, thereby shrinking the PVC film and causing the PVC film to securely and tightly wrap the connector's exterior surface. When the connector reaches in proximity to a housing bottom portion, the user may remove the connector (wrapped in the PVC film) from the housing interior portion via the elongated opening.

In this manner, the apparatus enables the user to conveniently wrap the connector with the PVC film by simply sliding down the connector in the housing interior portion via the elongated opening.

The present disclosure discloses an apparatus that facilitates a user to conveniently and quickly wrap a connector with a disposable protective film (e.g., a PVC film). The apparatus can be wall mounted or handheld, thereby enabling the user to easily operate the apparatus. Further, the apparatus eliminates the need to use caps to protect the connectors from contamination during transportation, thereby considerably saving resources and time required to install such caps.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts views of a vehicle's electrical distribution system (EDS) harness connector 100 (or connector 100) in an unwrapped state and a wrapped state in accordance with the present disclosure. Specifically, a view 102 depicts the connector 100 in an unwrapped state, and a view 104 depicts the connector 100 wrapped or covered by a flexible covering 106.

It is known that modern vehicles include a plurality of EDS harnesses, which in turn includes a plurality of components including, but not limited to, wires 108, one or more connectors (e.g., the connector 100), fuses, junction boxes (not shown), and/or the like. The EDS harnesses are susceptible to getting exposed to contaminants when the harnesses are transported or shipped (e.g., from their manufacturing plants to vehicle assembly lines). To protect the harness components, e.g., the connector 100, from getting adversely affected by the contaminants during transportation, the present disclosure discloses covering/wrapping the connector 100 with the flexible covering 106, which protects the connector 100 from exposure to any unwanted material (e.g., dust, debris, moisture, etc.). The flexible covering 106 is easy to install/wrap on the connector 100 (e.g., at the manufacturing plant or a location from where the connector 100 is transported), and easy to uninstall/unwrap from the connector 100 (e.g., at the assembly line where the EDS harness is installed in one or more vehicle components).

Although the description below is described in the context of covering/wrapping the connector 100 with the flexible covering 106 to protect the connector 100 from contaminants during transportation, the present disclosure is not limited to such an aspect. The present disclosure (and the apparatus described below) may be applied to covering/wrapping any small vehicle component with the flexible covering 106 to protect the component from contaminants during transportation, without departing from the present disclosure scope.

In some aspects, the flexible covering 106 may be a Poly Vinyl Chloride (PVC) film, having a thickness in a range of 25 to 30 micrometers. In an exemplary aspect, the flexible covering 106 has a thickness of 28 micrometers, and is non-flammable. Further, the flexible covering 106 may be shrinkable (e.g., may shrink in a range of 4-8% of its area when heated) and flexible (e.g., can be flexed or molded/twisted based on the shape of the object on which the flexible covering 106 is applied/wrapped).

To enable a user to conveniently and efficiently cover/wrap the connector 100 with the flexible covering 106, the present disclosure discloses an example apparatus 200 that is configured to automatically cover/wrap the connector 100 with the flexible covering 106. The apparatus' structural details and functionality are described below in conjunction with FIG. 2.

Figure 2:
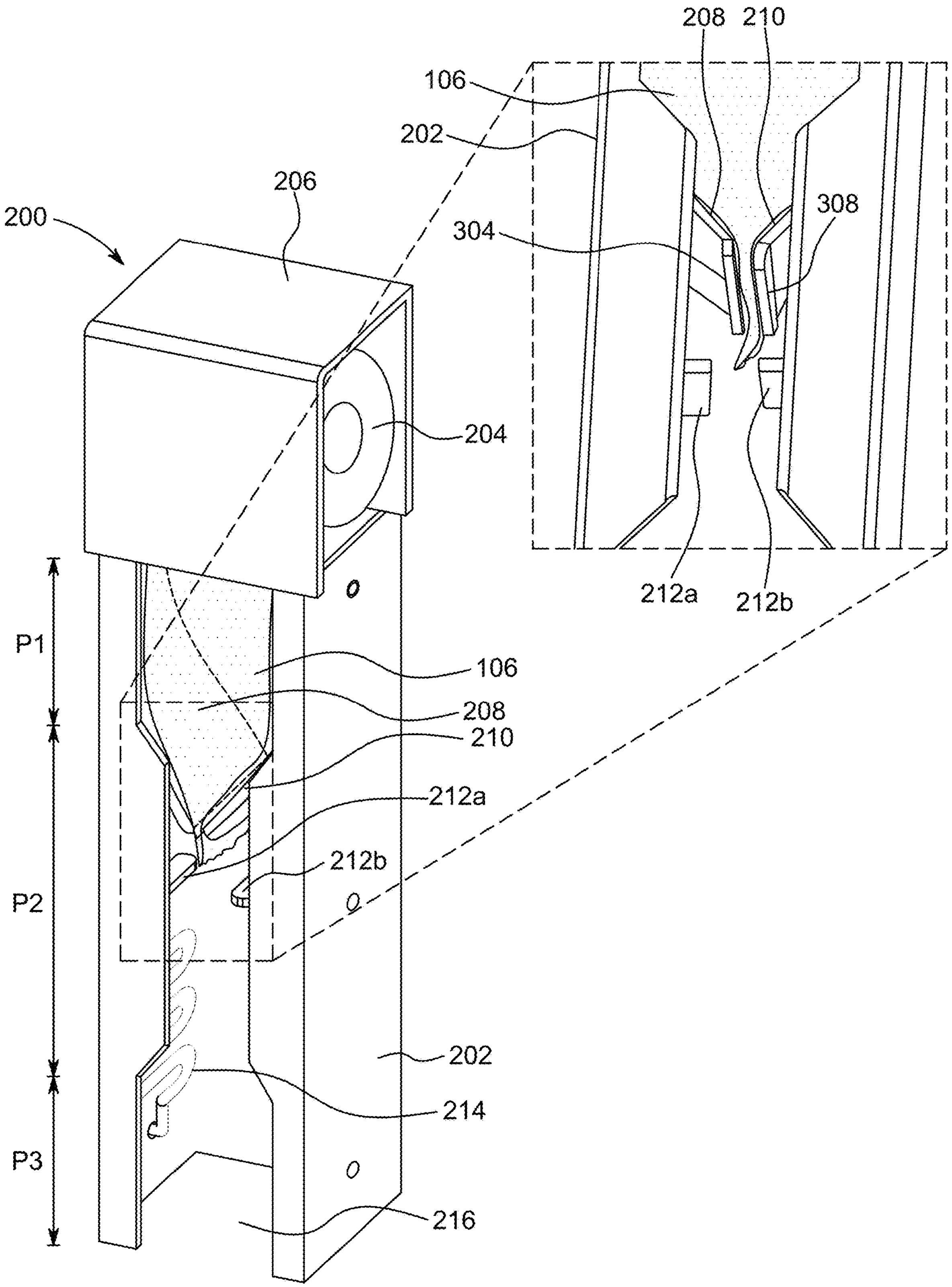
FIG. 2 depicts an example apparatus for covering/wrapping a connector with a flexible covering in accordance with the present disclosure.
Figure 3:
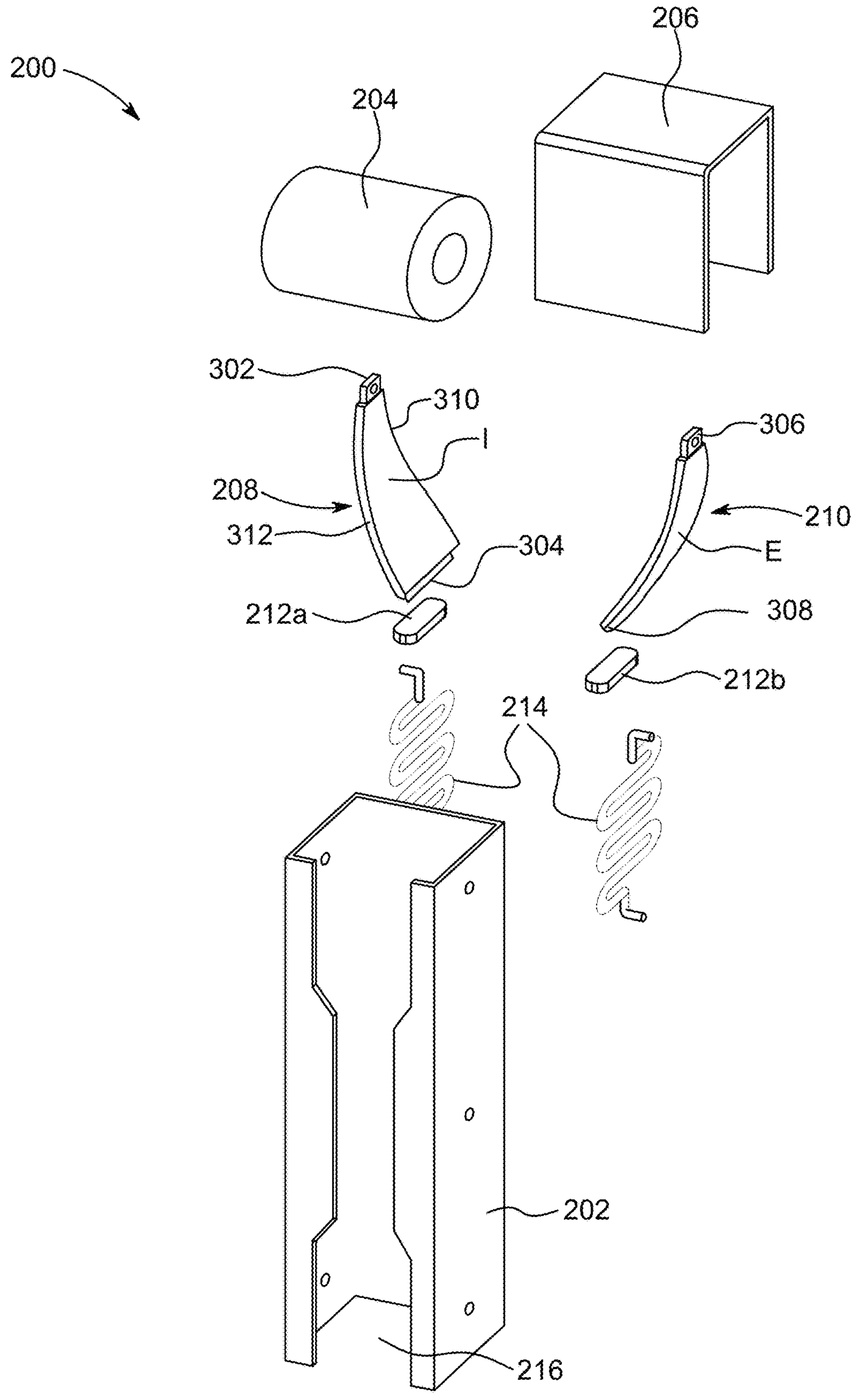
FIG. 3 depicts a disassembled view of the apparatus of FIG. 2 in accordance with the present disclosure.
Figure 4:
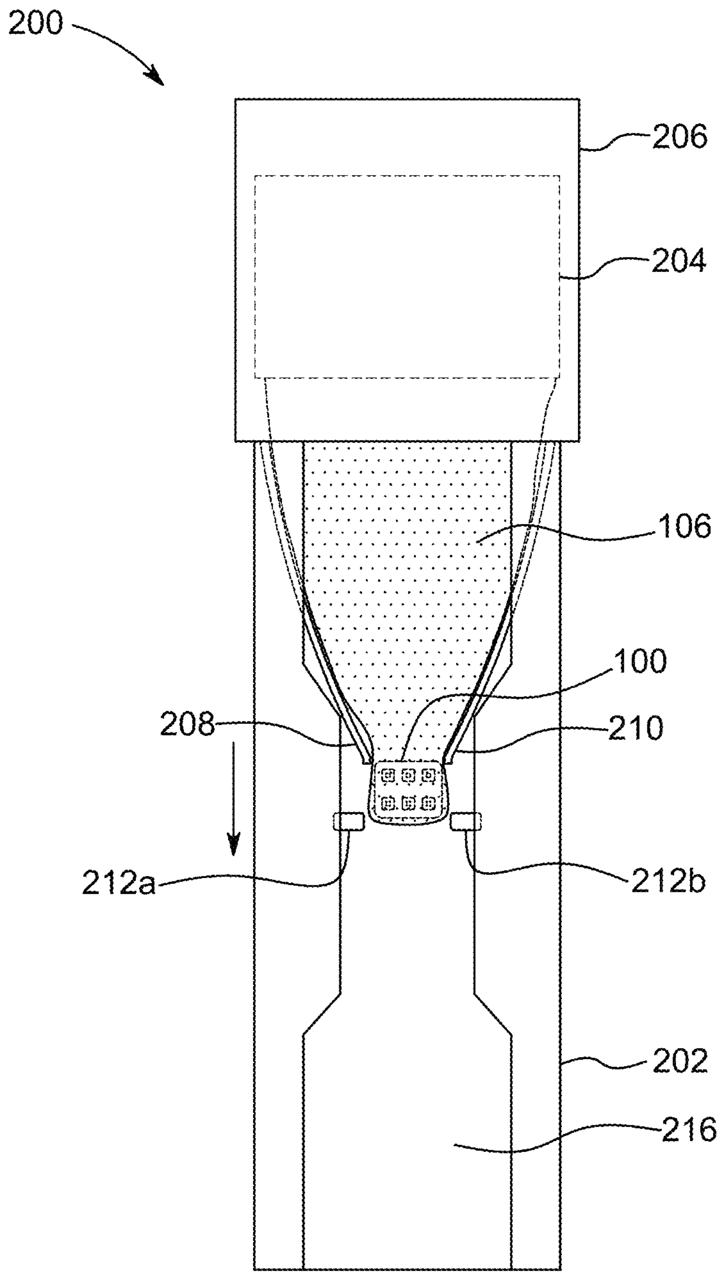
FIG. 4 depicts a view of a connector being slid in the apparatus of FIG. 2 in accordance with the present disclosure.
Figure 5:
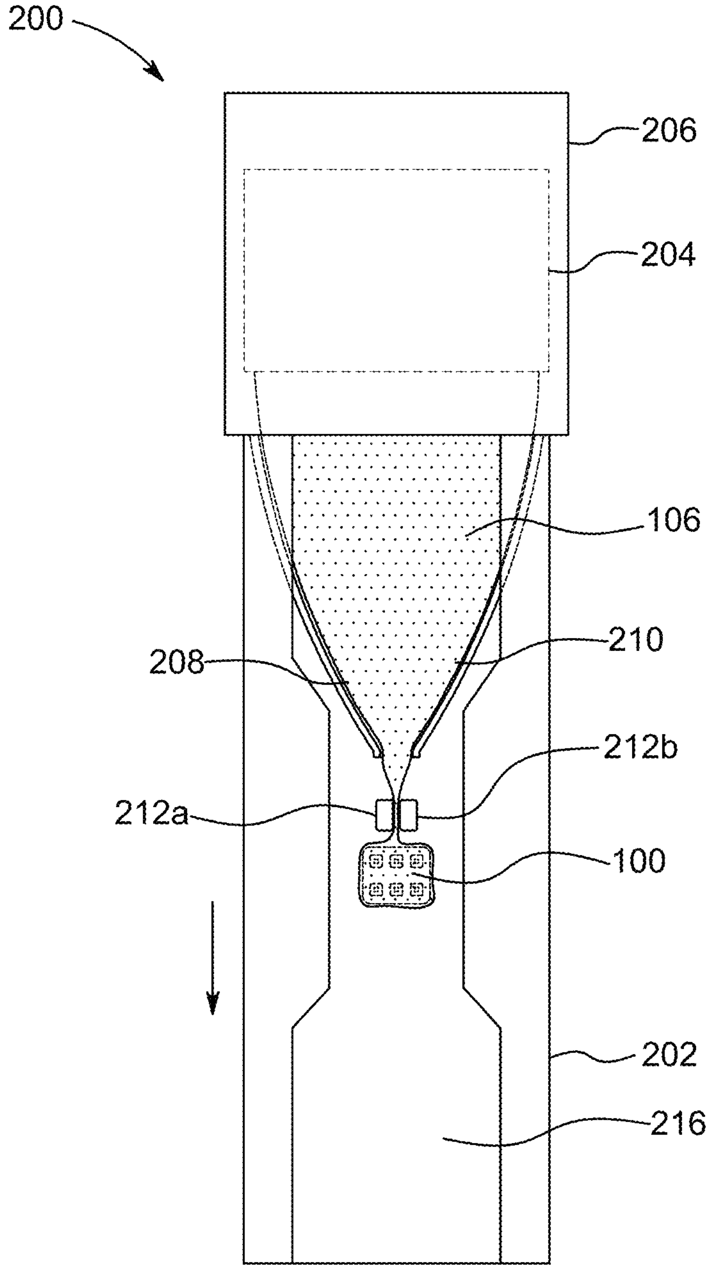
FIG. 5 depicts a view of a clamp cutting a flexible covering in the apparatus of FIG. 2 in accordance with the present disclosure.
Figure 6:
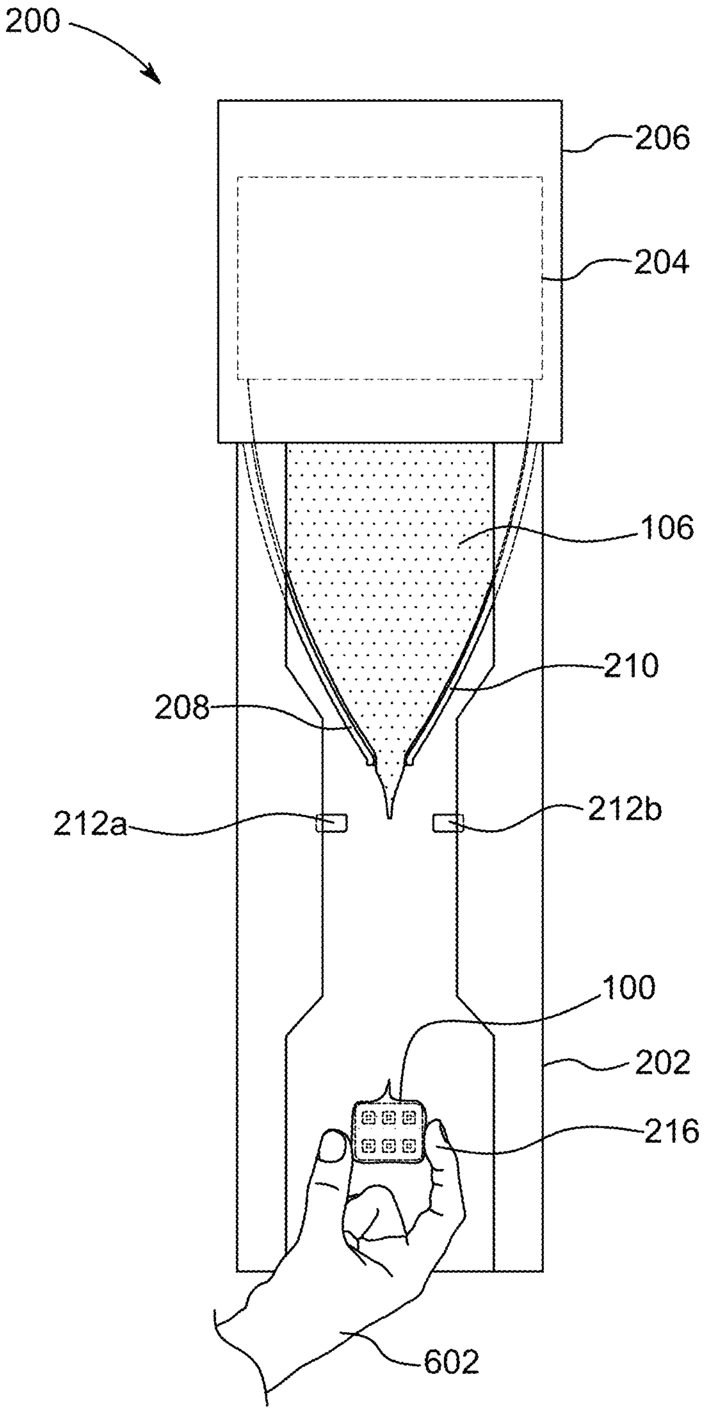
FIG. 6 depicts a view of a user removing a connector in a wrapped state from the apparatus of FIG. 2 in accordance with the present disclosure.

FIG. 2 depicts the apparatus 200 for covering/wrapping the connector 100 with the flexible covering 106 in accordance with the present disclosure. FIG. 2 will be described in conjunction with FIGS. 3, 4, 5, 6 and 7. FIG. 3 depicts an apparatus' disassembled view, and FIGS. 4-6 depict example views of the steps that may be implemented by an apparatus operator/user 602 (shown in FIG. 6) to cover the connector 100 with the flexible covering 106 by using the apparatus 200.

The apparatus 200 may be a wall mounted apparatus or a handheld apparatus that may be used by the user 602 to conveniently cover/wrap small vehicle components (e.g., the connector 100) with the flexible covering 106. By using the apparatus 200, the user 602 may cover/wrap the connector 100 with the flexible covering 106 within three to five seconds, thereby ensuring that the wrapping process is fast. Further, in alternative aspects (not shown), the apparatus 200 may not require the user 602 to operate the apparatus 200, and instead a robotic arm may use the apparatus 200 to automatically wrap/cover the connector 100 with the flexible covering 106.

In some aspects, the apparatus 200 may include a plurality of components including, but not limited to, a housing 202, a covering storage 204, a storage cover 206, a first retractable guide plate 208 (or first retractable guide 208), a second retractable guide plate 210 (or second retractable guide 210), a first cutter **212*a*, a second cutter 212*b*, one or more heating elements 214**, and/or the like.

The housing 202 may be made of aluminum or any other similar metal, and have a cuboidal shape with a hollow interior portion. Further, the housing 202 may have means (not shown) to mount the housing 202 on a wall. In additional or alternative aspects, the housing 202 may be small in size (e.g., with a height in a range of 8-14 inches, and a width in a range of 4-6 inches) and lightweight, which may enable the user 602 to conveniently operate the apparatus 200 in a handheld configuration. Furthermore, in some aspects, a housing front wall/portion (that faces away from the wall on which the housing 202 is mounted) may include an elongated opening 216 that may be configured to receive an external object (e.g., the connector 100 or any other small vehicle component to be wrapped with the flexible covering 106) and enable the external object/connector 100 to be slid in the hollow housing interior portion. For example, the user 602 may insert the connector 100 into the housing interior portion via an elongated opening top portion/part, then slide the connector 100 in the housing interior portion towards a housing bottom portion along an elongated opening length, and finally remove the connector 100 from the housing interior portion via an elongated opening bottom portion/part.

In some aspects, the elongated opening 216 (and hence the housing front wall) may include a first part "P1", a second part "P2" and a third part "P3" disposed along the elongated opening length, as shown in FIG. 2. The second part "P2" may be disposed between the first part "P1" and the third part "P3". Further, the first part "P1" may be disposed in proximity to a housing top portion, and the third part "P3" may be disposed in proximity to the housing bottom portion. In an exemplary aspect, the user 602 may insert the connector 100 into the housing interior portion via the first part "P1", slide the connector 100 in the housing interior portion via the first, second and third parts "P1", "P2" and "P3", and then remove the connector 100 from the housing interior portion via the third part "P3". In some aspects, widths of the first and third parts "P1" and "P3" may be greater than a width of the second part "P2", to enable the user 602 to conveniently insert and remove the connector 100 into/from the housing interior portion via the first and third parts "P1" and "P3". For example, the widths of the first and third parts "P1" and "P3" may be in a range of 60-80% of a housing front wall width, and the width of the second part "P2" may be in a range of 40-60% of the housing front wall width. In an alternative aspect (not shown), the width of the second part "P2" may also be in a range of 60-80% of the housing front wall width, and may be equivalent to the widths of the first and third parts "P1" and "P3".

The covering storage 204 may be disposed in the housing 202 in proximity to the housing top portion. The covering storage 204 may be configured to store and dispense the flexible covering 106 in the housing interior portion. In an exemplary aspect, when the flexible covering 106 is a PVC film (as described above in conjunction with FIG. 1), the covering storage 204 may be a bundle of PVC film. The storage cover 206 may be configured to enclose the covering storage 204/PVC film bundle, and protect the covering storage 204 from ambient environment.

The covering storage 204 may be disposed above the first and second retractable guides 208, 210 in the housing 202. In some aspects, the first and second retractable guides 208, 210 may be disposed in the housing interior portion, and may have the same structures and made of the same material (which may be, for example, plastic, metal, etc.). In an exemplary aspect, the first and second retractable guides 208, 210 are shaped as curved plates (e.g., concave shaped plates), which may have a smaller width at a guide top portion and a greater width at a guide bottom portion, as shown in FIG. 3. In alternative aspects (not shown), the first and second retractable guides 208, 210 may have a consistent/same width throughout a guide length.

The first retractable guide 208 may include a first proximal end/edge 302 and a first distal end/edge 304 (as shown in FIG. 3), and the second retractable guide 210 may include a second proximal end/edge 306 and a second distal end/edge 308. The widths of the first and second proximal edges 302, 306 may be less than the widths of the first and second distal edges 304, 308. Further, the first and second proximal edges 302, 306 may be disposed in proximity to the housing top portion (i.e., in proximity to the covering storage 204), and the first and second distal edges 304, 308 may be disposed away from the housing top portion.

The first and second retractable guides 208, 210 may be configured to pivotally/axially rotate about the respective first and second proximal edges 302, 306 when an object (e.g., the connector 100) is pushed "downwards" along the interior curved surfaces (shown as surface "I" in FIG. 3) of the first and second retractable guides 208, 210. Specifically, the first and second retractable guides 208, 210 are configured to retractably move from respective first and second closed positions to first and second open positions, when the connector 100 slides downwards along the housing interior portion towards the first and second distal edges 304, 308, touching the interior curved surfaces of the first and second retractable guides 208, 210.

In some aspects, the first distal edge 304 and the second distal edge 308 may be disposed in proximity to each other when the first retractable guide 208 is in the first closed position and the second retractable guide 210 is in the second closed position, as shown in FIG. 2. Specifically, in the first and second closed positions, the gap or distance between the first and second distal edges 304, 308 may be very small (e.g., tending to zero). In an exemplary aspect, the first and second closed positions may be the default positions of the first and second retractable guides 208, 210. Further, the first distal edge 304 and the second distal edge 308 may be disposed away from each other when the first retractable guide 208 is in the first open position and the second retractable guide 210 is in the second open position, as shown in FIG. 4. Specifically, when the user 602 (or a robotic arm) slides the connector 100 downwards in the housing interior portion, the connector body may touch and push the interior curved surfaces of the first and second retractable guides 208, 210, causing the first and second distal edges 304, 308 to move away from each other (and hence causing the first and second retractable guides 208, 210 to move to respective first and second open positions), as shown in FIG. 4.

Further, since the first and second closed positions are the default positions of the first and second retractable guides 208, 210, the first and second retractable guides 208, 210 may return back to their respective first and second closed positions when the connector 110 "exits" the first and second retractable guides 208, 210 while the connector 110 is being slid in the housing interior portion, as shown in FIG. 5. Specifically, when the user 602 (or the robotic arm) continues to slide down the connector 110 in the housing interior portion when the first and second retractable guides 208, 210 are in the first and second open positions (as described above), the connector 100 may exit the first and second retractable guides 208, 210, and the connector body may stop touching the interior curved surfaces of the first and second retractable guides 208, 210 when the connector 100 has moved past the first and second distal edges 304, 308. At this time, the first and second retractable guides 208, 210 may automatically rotate back (about the first and second proximal edges 302, 306) to their respective first and second closed positions. In some aspects, the first and second proximal edges 302, 306 may include spring-based mechanisms that may enable the first and second retractable guides 208, 210 to return back to their respective first and second closed positions when the connector 100 exits the first and second retractable guides 208, 210 and the connector body stops touching their interior curved surfaces.

In some aspects, the interior curved surfaces of the first and second retractable guides 208, 210 face each other, and exterior curved surfaces (shown as surface "E" in FIG. 3) of the first and second retractable guides 208, 210 are disposed opposite to the interior curved surfaces. In an exemplary aspect, the flexible covering 106 (that is dispensed from the covering storage 204) may form a "cup-shaped" structure around the exterior curved surfaces and the first and second distal edges 304, 308. In another exemplary aspect, the flexible covering may form the cup-shaped structure between the interior curved surfaces and the first and second distal edges 304, 308, as shown in FIG. 2. In some aspects, the flexible covering 106, which is dispensed from the covering storage 204, may touch interior edges 310 and portions of the interior curved surfaces of the first and second retractable guides 208. The interior edges 310 may be those elongated edges of the first and second retractable guides 208 that are disposed in proximity to (and face) a housing back wall/surface (that may be wall-mounted), and may be disposed opposite to exterior edges 312. The exterior edges 312 may be those elongated edges of the first and second retractable guides 208 that are disposed in proximity to (and face) the elongated opening 216. In alternative aspects, the flexible covering 106 may not touch the interior edges 310, and may only touch portions of the interior curved surfaces of the first and second retractable guides 208. Furthermore, the flexible covering 106 may extend from the interior curved surfaces of the first and second retractable guides 208 towards the first and second distal edges 304, 308. The flexible covering 106 that extends from the interior curved surfaces of the first and second retractable guides 208 is connected to form a cup-shaped structure at the first and second distal edges 304, 308, as shown in FIG. 2.

When the user 602 slides the connector 100 downwards in the housing interior portion and the connector body touches the first and second distal edges 304 (to cause them to move to their respective first and second open positions), the connector body's bottom surface may "push down" the cup-shaped structure of the flexible covering 106 in proximity the first and second distal edges 304, as shown in FIG. 4. As the connector body's bottom surface pushes down the flexible covering's cup-shaped structure, the flexible covering's cup-shaped structure may cover or wrap around the connector body's exterior surface, thereby wrapping the connector body's bottom surface and also the connector body's sidewalls. Since the flexible covering's cup-shaped structure is pushed down by the connector body when the connector 100 is slid down in the housing interior portion, the flexible covering 106 may experience a "pull", which may cause the covering storage 204 to dispense additional flexible covering 106 to touch the interior edges 310 and/or the interior curved surfaces of the first and second retractable guides 208, 210. In this manner, the covering storage 204 dispenses the flexible covering 106 when the user 602 slides down the connector 100 in the housing interior portion (when the first and second retractable guides 208, 210 are in their respective first and second open positions), causing the connector body to push the flexible covering's cup-shaped structure downwards, which in turn causes the covering storage 204 (i.e., the PVC film bundle) to dispense additional flexible covering 106 (i.e., the PVC film) under the influence of the "pull" experienced by the flexible covering 106.

In some aspects, the first and second cutters 212*a*, 212*b* (collectively referred to as cutters 212) may be disposed in proximity to and under the first and second distal edges 304, 308. The cutters 212 may be configured to cut the flexible covering 106 in proximity to the connector 100 when the connector 100 "exits" the first and second retractable guides 208, 210 (i.e., when the connector body stops touching the first and second retractable guides 208, 210) and the first and second retractable guides 208, 210 return back to their respective first and second closed position, as shown in FIG. 5. In some aspects, when the user 602 slides down the connector 100 in the housing portion and the connector 100 exits the first and second retractable guides 208, 210, the flexible covering's cup-shaped structure may wrap the connector body's bottom surface and sidewalls, as described above. At this time, the cutters 212 may cut the flexible covering 106 that may be present between the connector 100 (e.g., at a connector's top surface) and the first and second distal edges 304, 308.

In additional aspects, the cutters 212 may include in-built heaters that may heat the flexible covering 106 as the flexible covering 106 may be getting cut by the cutters 212. Due to the flexible covering's heating, the flexible covering 106 under the first and second distal edges 304, 308 may get "gelled" or connected together to form the cup-shaped structure described above. Further, the flexible covering's heating may cause the flexible covering 106 on the connector's top surface to also gel or get connected, thereby completely enclosing the connector's top surface with the flexible covering 106. In this manner, the connector body's bottom surface, sidewalls and the connector's top surface may get enclosed by the flexible covering 106.

In an exemplary aspect, the cutters 212 may be configured to move between an inactive state and an active state. In the inactivate state, the cutters 212 may be disposed in a lateral configuration parallel to the housing back wall or disposed away from each other, as shown in FIGS. 2, 4 and 6. In this state, the cutters 212 may be disposed away from each other and not configured to cut the flexible covering 106. In some aspects, the cutters 212 may be disposed away from each other in the inactive state to provide a "passage" for the connector 100 to slide down the housing interior portion without any hindrance or interruption. In the active state, the cutters 212 may be disposed in an extended configuration perpendicular to the housing back wall, as shown in FIG. 5. In this state, the cutters 212 may face each other and configured to "cut" (and heat) the flexible covering 106 that may be present between the two cutters 212*a*, 212*b*.

In some aspects, the cutter's default position may be the inactive state. The cutters 212 may move from the inactivate state to the active state based on a user input. For example, the user 602 may manually move the cutters 212 from the inactivate state to the active state to cause the cutters 212 to cut the flexible covering 106, when the connector 100 exits the first and second retractable guides 208, 210 as described above. In additional or alternative aspects, the cutters 212 (or the apparatus 200) may include one or more sensors (e.g., motion sensors or proximity sensors, not shown) that may be configured to detect a connector's motion in the housing interior portion when the connector 100 exits the first and second retractable guides 208, 210 and/or stops touching the first and second retractable guides 208, 210. In this case, the cutters 212 may move automatically from the inactivate state to the active state and cut the flexible covering 106 based on inputs captured and obtained from the sensors (e.g., when the inputs indicate that the connector 100 has exited the first and second retractable guides 208, 210 or moved past the first and second distal edges 304, 308).

As described above, the apparatus 200 may further include the heating elements 214. The heating elements 214 may be disposed in the housing interior portion below or under the first and second distal edges 304, 308. In an exemplary aspect, the heating elements 214 are disposed below or under the cutters 212. When the user 602 continues to slide the connector 100 in the housing interior portion after the connector 100 exits the first and second retractable guides 208, 210 and the cutters 212 cut the flexible covering 106 above the connector 100, the connector 100 may pass through an area/volume heated by the heating elements 214. The heat generated by the heating elements 214 may cause the flexible covering 106 enclosing the connector 100 to shrink, thereby causing the flexible covering 106 to securely and tightly wrap the connector 100. In this manner, the heating elements 214 heat the flexible covering 106 disposed on the connector body's exterior surface to cause the flexible covering 106 to securely and tightly enclose/wrap the connector 100.

In operation, the user 602 or a robotic arm may first insert the connector 100 into the housing interior portion via the elongated opening's first part "P1". The user 602 may then slide the connector 100 downwards in the housing interior portion, causing the connector 100 to touch and push the interior curved surfaces of the first and second retractable guides 208, 210, which in turn causes the first and second retractable guides 208, 210 to move from respective first and second closed positions to the first and second open positions. Specifically, when the user 602 pushes the connector 100 downwards along the interior curved surfaces of the first and second retractable guides 208, 210, the connector 100 may cause the first and second distal ends 304, 308 to move away from each other as described above and as shown in FIG. 4. Further, at this stage, the flexible covering 106 on the interior curved surfaces of the first and second retractable guides 208, 210 and the flexible covering's cup-shaped structure below the first and second distal ends 304, 308 may get stretched under the force of the connector's downward push.

When the connector 100 exits the first and second retractable guides 208, 210 or is disposed below the first and second distal ends 304, 308, the cutters 212 may cut the flexible covering 106 above the connector 100, as shown in FIG. 5. At this stage, the first and second retractable guides 208, 210 may automatically return back to their respective first and second closed positions.

Figure 7:
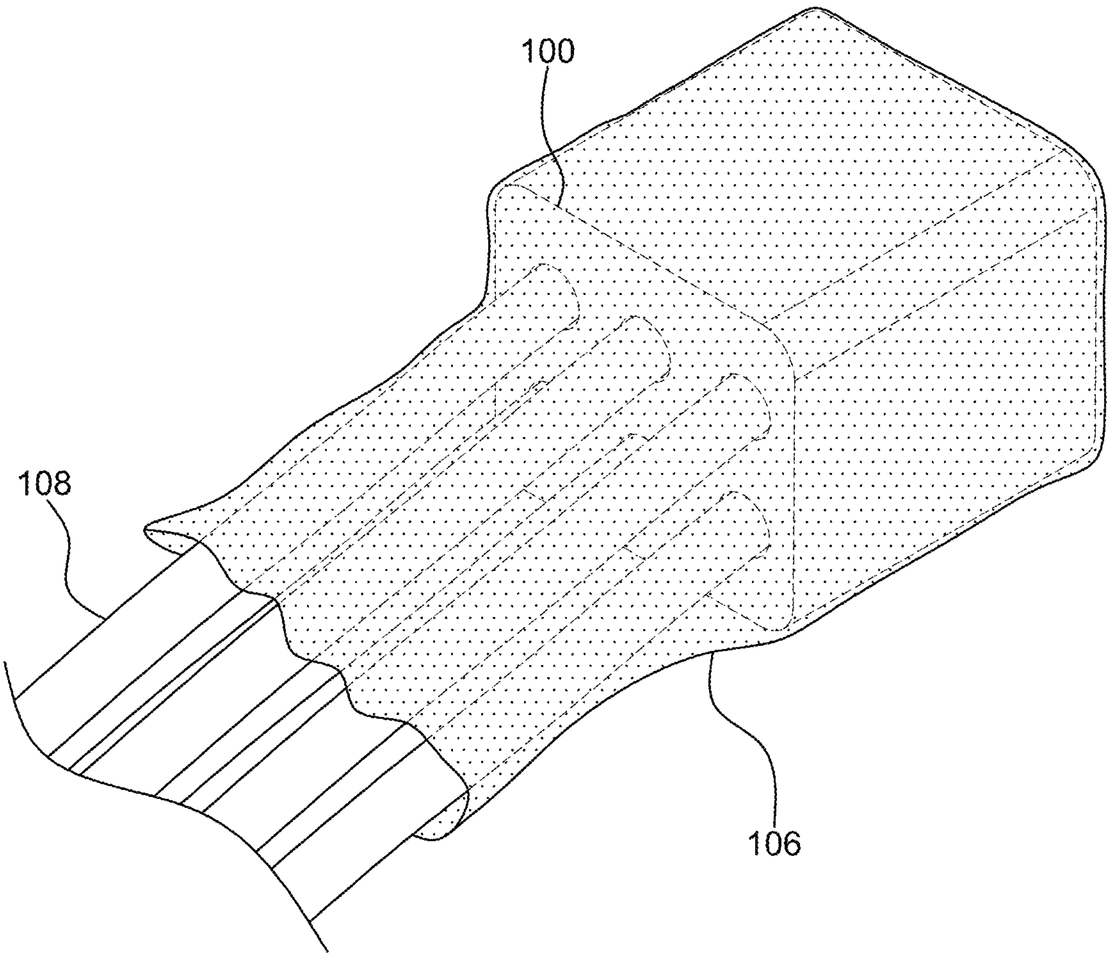
FIG. 7 depicts a view of a connector in a wrapped state removed from the apparatus of FIG. 2 in accordance with the present disclosure.

Thereafter, the user 602 may continue to slide the connector 100 downwards away from the cutters 212 in the housing interior portion. At this stage, the cutters 212 may return to their default inactivate state. Further, as the connector 100 moves away from the cutters 212, the heat generated from the heating elements 214 may heat and shrink the flexible covering 106 on the connector's exterior surface, causing the flexible covering 106 to securely and tightly wrap the connector 100. When the user 602 has slid the connector 100 through the housing interior portion length and the connector 100 has reached the elongated opening's third part "P3", the user 602 may remove the connector 100 wrapped in the flexible covering 106 from the housing interior portion, as shown in FIG. 6. An example view of the connector 100 (including the wires 108) wrapped in the flexible covering 106, when the user 602 removes the connector 100 from the housing interior portion, is shown in FIG. 7.

In this manner, the apparatus 200 enables the user 602 to conveniently wrap the connector 100 with the flexible covering 106, by simply sliding the connector 100 in the housing interior portion via the elongated opening 216.

It may be appreciated that during the vehicle's assembling process, the user 602 may easily remove the flexible covering 106 from the connector 100 at the assembly line and dispose off the flexible covering 106. Removal of the flexible covering 106 (i.e., the PVC film) from the connector 100 is considerably easier than removing caps which are conventionally used to protect the connector 100 from contaminants during transportation.

Figure 8:
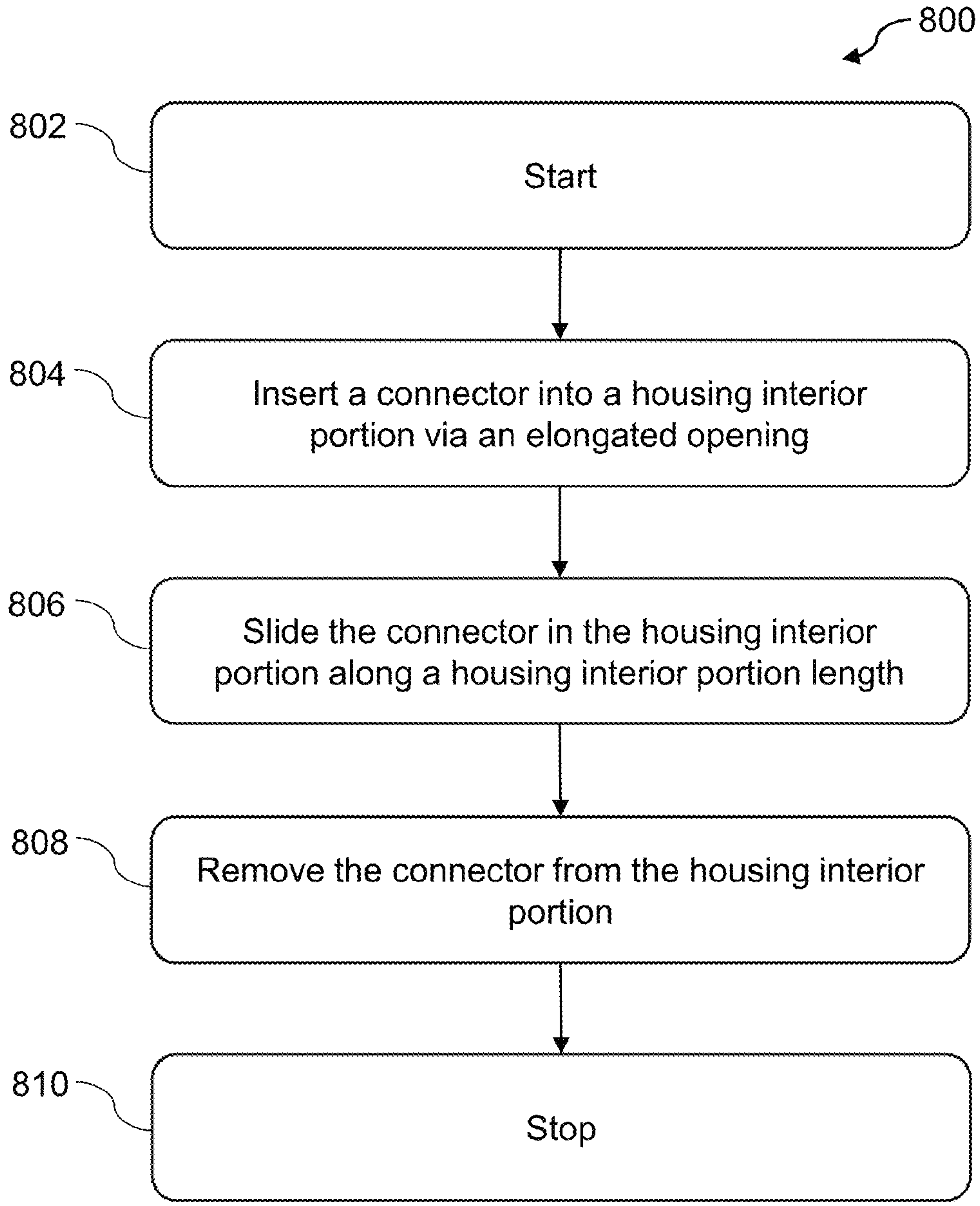
FIG. 8 depicts a flow diagram of an example method to cover a connector with a flexible covering in accordance with the present disclosure.

FIG. 8 depicts a flow diagram of an example method 800 to cover the connector 100 with the flexible covering 106 in accordance with the present disclosure. FIG. 8 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 800 starts at step 802. At step 804, the method 800 may include inserting the connector 100 into the housing interior portion via the elongated opening first part "P1". At step 806, the method 800 may include sliding the connector 100 in the housing interior portion via the elongated opening 216 along a housing interior portion length. As described above, when the connector 100 is slid in the housing interior portion, the apparatus 200 wraps the connector 100 with the flexible covering 106.

At step 808, the method 800 may include removing the connector 100 (wrapped or enclosed in the flexible covering 106) from the housing interior portion via the elongated opening third part "P3". The method 800 may end at step 810.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as “a,” “the,” “said,” etc. should be read to recite one or more of the indicated elements unless a claim recites an explicit limitation to the contrary. Conditional language, such as, among others, “can,” “could,” “might,” or “may,” unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An apparatus comprising:

a housing comprising an elongated opening configured to receive an external object and enable the external object to slide in a housing interior portion;

a covering storage configured to store and dispense a flexible covering;

a first retractable guide disposed in the housing and configured to retractably move from a first closed position to a first open position and then return back to the first closed position when the external object slides in the housing interior portion touching the first retractable guide, wherein:

the covering storage dispenses the flexible covering that covers an external object exterior surface when the first retractable guide moves from the first closed position to the first open position; and a heating element configured to heat the flexible covering on the external object exterior surface to cause the flexible covering to enclose the external object.

2. The apparatus of claim 1, wherein the first retractable guide returns back to the first closed position when the external object stops touching the first retractable guide while the external object is being slid in the housing interior portion.

3. The apparatus of claim 2 further comprising a cutter configured to cut the flexible covering in proximity to the external object when the external object stops touching the first retractable guide and the first retractable guide returns back to the first closed position.

4. The apparatus of claim 3, wherein the first retractable guide comprises a first proximal end disposed in proximity to a housing top portion and a first distal end disposed away from the housing top portion, and wherein the cutter is disposed in proximity to the first distal end.

5. The apparatus of claim 3, wherein the cutter cuts the flexible covering based on a user input.

6. The apparatus of claim 3 further comprising a sensor configured to detect a motion of the external object when the external object stops touching the first retractable guide, and wherein the cutter cuts the flexible covering based on inputs obtained from the sensor.

7. The apparatus of claim 1, wherein the housing is cuboidal, wherein the housing is configured to be mounted on a wall, and wherein the elongated opening is disposed on a housing front wall.

8. The apparatus of claim 1, wherein the covering storage is disposed in the housing in proximity to a housing top portion.

9. The apparatus of claim 1, wherein the covering storage is disposed above the first retractable guide in the housing.

10. The apparatus of claim 1 further comprising a second retractable guide disposed in the housing and configured to retractably move from a second closed position to a second open position and then return back to the second closed position when the external object slides in the housing interior portion touching the second retractable guide, wherein the covering storage dispenses the flexible covering that covers the external object exterior surface when the second retractable guide moves from the second closed position to the second open position.

11. The apparatus of claim 10, wherein:

the first retractable guide comprises a first proximal end and a first distal end, and the second retractable guide comprises a second proximal end and a second distal end, the first distal end and the second distal end are disposed in proximity to each other when the first retractable guide is in the first closed position and the second retractable guide is in the second closed position, and the first distal end and the second distal end are disposed away from each other when the first retractable guide is in the first open position and the second retractable guide is in the second open position.

12. The apparatus of claim 11, wherein:

interior surfaces of the first retractable guide and the second retractable guide face each other, and exterior surfaces of the first retractable guide and the second retractable guide are disposed opposite to the interior surfaces, predefined portions of the interior surfaces touch the flexible covering dispensed from the covering storage, the flexible covering extend from the interior surfaces towards the first distal end and the second distal end, and the flexible covering extending from the interior surfaces is connected to form a cup-shaped structure at the first distal end and the second distal end.

13. The apparatus of claim 11, wherein the heating element is disposed below the first distal end and the second distal end.

14. The apparatus of claim 1, wherein the external object is an electrical distribution system (EDS) harness connector of a vehicle.

15. The apparatus of claim 1, wherein the flexible covering is a Poly Vinyl Chloride (PVC) film.

16. The apparatus of claim 15, wherein the covering storage is a bundle of PVC film.

17. The apparatus of claim 1, wherein a flexible covering thickness is in a range of 25 to 30 micrometers.

18. An apparatus comprising:

a housing comprising an elongated opening configured to receive an external object and enable the external object to slide in a housing interior portion;

a covering storage configured to store and dispense a flexible covering;

a first retractable guide disposed in the housing and configured to retractably move from a first closed position to a first open position and then return back to the first closed position when the external object slides in the housing interior portion touching the first retractable guide, wherein:

the covering storage dispenses the flexible covering that covers an external object exterior surface when the first retractable guide moves from the first closed position to the first open position;

a cutter configured to cut the flexible covering in proximity to the external object when the first retractable guide returns back to the first closed position; and a heating element configured to heat the flexible covering on the external object exterior surface to cause the flexible covering to enclose the external object.

19. The apparatus of claim 18, wherein the external object is an electrical distribution system (EDS) harness connector of a vehicle.

20. A method for covering an external object with a flexible covering, the method comprising:

inserting the external object into an elongated opening of a housing;

sliding the external object in a housing interior portion via the elongated opening, wherein:

the housing comprises a retractable guide configured to retractably move from a closed position to an open position and then return back to the closed position when the external object slides in the housing interior portion touching the retractable guide, a covering storage dispenses the flexible covering that covers an external object exterior surface when the retractable guide moves from the closed position to the open position, and a heating element heats the flexible covering on the external object exterior surface to cause the flexible covering to enclose the external object; and removing the external object enclosed with the flexible covering from the housing interior portion via the elongated opening.

* * * * *